(12) United States Patent
Okada et al.

(10) Patent No.: US 7,345,468 B2
(45) Date of Patent: Mar. 18, 2008

(54) DETECTION SIGNAL PROCESSING CIRCUIT AND DETECTION SIGNAL PROCESSING APPARATUS FOR A ROTATION SENSOR

(75) Inventors: Hiroshi Okada, Aichi-ken (JP); Mikio Sugiki, Toyokawa (JP); Yasuaki Makino, Okazaki (JP)

(73) Assignee: DENSO CORPORATION, Kariya (JP)

( * ) Notice: Subject to any disclaimer, the term of this patent is extended or adjusted under 35 U.S.C. 154(b) by 144 days.

(21) Appl. No.: 11/067,681

(22) Filed: Mar. 1, 2005

(65) Prior Publication Data

US 2005/0194964 A1 Sep. 8, 2005

(30) Foreign Application Priority Data

Mar. 2, 2004 (JP) ............... 2004-057908

(51) Int. Cl.
*G01P 13/00* (2006.01)
*G01P 3/54* (2006.01)
*G01B 7/30* (2006.01)

(52) U.S. Cl. .................. 324/165; 324/166; 324/207.25

(58) Field of Classification Search ................ 324/160, 324/163, 165, 166, 173, 174, 178, 179, 207.13, 324/207.15, 207.2, 207.21, 207.25; 73/514.39; 340/671, 672
See application file for complete search history.

(56) References Cited

U.S. PATENT DOCUMENTS

| 3,614,616 | A | * | 10/1971 | Bucek et al. ............... 324/165 |
| 5,500,585 | A | * | 3/1996 | Aab ........................... 324/165 |
| 6,844,723 | B2 | * | 1/2005 | Shirai et al. ........... 324/207.25 |
| 2004/0100251 | A1 | * | 5/2004 | Lohberg ..................... 324/166 |

FOREIGN PATENT DOCUMENTS

JP 10-332725 12/1998

* cited by examiner

*Primary Examiner*—Reena Aurora
(74) *Attorney, Agent, or Firm*—Posz Law Group, PLC

(57) ABSTRACT

Detecting the rotational direction of a rotor is feasible by allowing a constant current source to supply a constant current flowing from an electric potential supply line to the earth in response to a turning-on action of a switch. Accordingly, detecting both the rotational speed and the rotational direction of the rotor is feasible by using three wiring cables of a power source line, an earth line, and a signal line outputting a pulse signal in accordance with the rotation of the gear. Using such a one-stage voltage adjustment enables the detection signal processing circuit to reduce electric power consumption compared with a system requiring a two-stage voltage adjustment.

16 Claims, 10 Drawing Sheets

DETECTION SIGNAL PROCESSING CIRCUIT AND DETECTION SIGNAL PROCESSING APPARATUS FOR A ROTATION SENSOR

CROSS-REFERENCE TO RELATED APPLICATION

This application is based upon and claims the benefit of priority from earlier Japanese Patent Application No. 2004-57908 filed on Mar. 2, 2004 so that the description of which is incorporated herein by reference.

BACKGROUND OF THE INVENTION

The present invention relates to a detection signal processing circuit for a rotation sensor and a related apparatus capable of detecting the rotational direction and the rotational speed of a rotor based on detection signals of two sensing elements.

The rotation sensors, capable of accurately detecting not only a rotational angle but also a rotational direction (e.g. reverse rotation such as backlash), are preferably used as crank angle sensors and cam angle sensors for automotive vehicles. FIG. 9A is a detection signal processing circuit 110 applicable to this kind of rotation sensor. The detection signal processing circuit 110 includes two magnetic sensors (not shown) disposed in a confronting relationship with a gear 50 so that two detection signals having a phase difference are produced from these two magnetic sensors. The detection signal processing circuit 110 detects the rotational direction of the gear 50 based on the detection signals of these magnetic sensors. The detection signal processing circuit 110 outputs the detected rotational direction via a signal line 144 to a rotational direction processing circuit 132 in ECU 130. On the other hand, the detection signal processing circuit 110 outputs a pulse signal representing the rotation of the gear 50 via a signal line 145 to a rotation signal processing circuit 134 of ECU 130. Furthermore, the detection signal processing circuit 110 is connected via a power source line 142 to a power source Vcc of ECU 130 and is also connected via an earth line 146 to the earth.

FIG. 9B shows a rotational direction signal and a rotational speed signal produced from the detection signal processing circuit 110. The rotational direction signal produced via the signal line 144 is 0 V when the gear 50 is rotating in the forward direction, and increases to 5 V when the gear 50 is rotating in the reverse direction. The rotational speed signal produced via the signal line 145 is a pulse signal representing the rotation of the gear 50.

The crank angle sensor and the cam angle sensor of an automotive vehicle are usually positioned in the vicinity of an engine control ECU. Using the above-described four cables (i.e. lines 142, 144, 145, and 146) shown in FIG. 9A is not so inconvenient. However, the rotation sensor detecting the rotational speed of a wheel is located far from the ECU. Using a total of four cables for each rotation sensor will cause the problems of wiring weight and wiring space.

In view of the above problems, the applicant of this invention has already proposed a detection signal processing device for a rotation sensor which is capable of reducing the number of cables (refer to the Japanese Patent Application Laid-open No. 10-332725 (1998)). According to this prior art technique, as shown in FIG. 10A, a forward/reverse judging circuit 304 detects a rotational direction of a rotor (not shown). The forward/reverse judging circuit 304 turns on a switch SW2 in response to detection of rotor's forward rotation, to supply a constant current Ib'. The forward/reverse judging circuit 304 turns on a switch SW3 in response to detection of rotor's reverse rotation, to supply a constant current Ic'. As shown in FIG. 10B, during the forward rotation, the pulse signal representing the rotation of the rotor has a current value of Ia' at its low level and Ia'+Ib' at its high level.

During the reverse rotation of the rotor, the pulse signal representing the rotation of the rotor has a current value of Ia' at its low level and Ia'+Ic' at its high level. The current Ia' is required for activating a constant voltage circuit 302. Accordingly, the electric potential of an output line 246 is R10×(Ia'+Ib') at the high level of the detection signal during the forward rotation of the rotor, and R10×(Ia'+Ic') at the high level of the detection signal during the reverse rotation of the rotor. Thus, performing forward/reverse judgment with respect to the rotational direction of the rotor is feasible by using only two wiring cables of a power source line 242 and the signal line 246.

However, the above-described prior art technique requires three discriminable current values (Ia', Ia'+Ib', and Ia'+Ic') for discriminating the rotational direction. Accordingly, electric power consumption of the rotation sensor will increase. As described above, when the rotation sensor is positioned far from the ECU to detect the rotation of a wheel, the electric power consumption in the wiring will also increase. This is the reason why the above-described conventional technique is not preferably applicable to heavy-duty trucks or buses due to their longer bodies.

SUMMARY OF THE INVENTION

In view of the above-described problems, the present invention has an object to provide a detection signal processing circuit for a rotation sensor and a related apparatus capable of outputting detection signals representing the rotational direction and the rotational speed of a rotor with three wiring cables and also capable of reducing electric power consumption.

In order to accomplish the above-described and other related objects, the present invention provides a detection signal processing circuit for a rotation sensor, including two sensing elements disposed in a confronting relationship with a rotor to produce detection signals having different phases in accordance with rotation of the rotor, and detecting both the rotational speed and the rotational direction of the rotor based on the detection signals. The detection signal processing circuit of the present invention includes a pulse signal generating means, a forward/reverse judging means, and an electric potential changing means. The pulse signal generating means is capable of generating a pulse signal in response to a change occurring in the level of the detection signal produced from at least one of two sensing elements. The forward/reverse judging means is capable of generating a judgment signal corresponding to the rotational direction of the rotor based on the detection signals of two sensing elements. And, the electric potential changing means is capable of changing an electric potential supplied from a power source line in accordance with the judgment signal of the forward/reverse judging means.

Furthermore, the present invention provides a first detection signal processing apparatus for a rotation sensor including a detection signal processing circuit and a rotational direction signal binarization circuit. The detection signal processing circuit includes two sensing elements disposed in a confronting relationship with a rotor to produce detection signals having different phases in accordance with rotation of the rotor and detects the rotational speed and the rotational direction of the rotor based on the detection signals. And, the rotational direction signal binarization circuit generates a binary signal representing the rotational direction of the rotor. The detection signal processing circuit includes a pulse signal generating means, a forward/reverse judging means, and a current path forming means. The pulse signal generating means is capable of generating a pulse signal in response to a change occurring in the level of the detection signal produced from at least one of two sensing elements. The forward/reverse judging means is capable of generating a judgment signal corresponding to the rotational direction of the rotor based on the detection signals of two sensing elements. And, the current path forming means is capable of allowing a constant current to flow from an electric potential supply line to an earth line in response to the judgment signal of the forward/reverse judging means. Meanwhile, the rotational direction signal binarization circuit is connected to a voltage source via a resistor. A connecting point of the resistor and the rotational direction signal binarization circuit is connected to the electric potential supply line of the current path forming means. And, the rotational direction signal binarization circuit detects the constant current flowing from the electric potential supply line to the earth line based on a voltage drop occurring at the resistor, and generates the binary signal representing the rotational direction of the rotor.

Moreover, the present invention provides a second detection signal processing apparatus for a rotation sensor including a detection signal processing circuit and a rotational direction signal binarization circuit. The detection signal processing circuit includes two sensing elements disposed in a confronting relationship with a rotor to produce detection signals having different phases in accordance with rotation of the rotor and detects the rotational speed and the rotational direction of the rotor based on the detection signals. And, the rotational direction signal binarization circuit generates a binary signal representing the rotational direction of the rotor. The detection signal processing circuit includes a pulse signal generating means, a forward/reverse judging means, and a current path forming means. The pulse signal generating means is capable of generating a pulse signal in response to a change occurring in the level of the detection signal produced from at least one of two sensing elements. The forward/reverse judging means is capable of generating a judgment signal corresponding to the rotational direction of the rotor based on the detection signals of two sensing elements. And, the current path forming means is capable of allowing a constant current to flow from a power source line to an earth line via a resistor in response to the judgment signal of the forward/reverse judging means. Meanwhile, the rotational direction signal binarization circuit detects the constant current flowing from the power source line to the earth line based on a voltage change occurring in the power source line, and generates the binary signal representing the rotational direction of the rotor.

According to the detection signal processing circuit for a rotation sensor of the present invention, the pulse signal generating means outputs a pulse signal in response to a change occurring in the level of the detection signal produced from at least one of two sensing elements. On the other hand, the forward/reverse judging means generates a judgment signal corresponding to the rotational direction of the rotor based on the detection signals of two sensing elements. And, the electric potential changing means changes an electric potential supplied from a power source line in accordance with the judgment signal of the forward/reverse judging means. According to the detection signal processing circuit of the present invention, outputting a signal representing the rotational direction of the rotor is feasible by changing the electric potential supplied from the power source line. In other words, detecting both the rotational speed and the rotational direction of the rotor is feasible by using three wiring cables of the power source line, the earth line, and the signal line outputting the pulse signal in accordance with the rotation of the rotor. Furthermore, detecting the rotational direction of the rotor is realized by reducing the electric potential of the power source line, namely by using the voltage adjustment of only one stage. Accordingly, the detection signal processing circuit of the present invention can reduce the electric power consumption compared with a system requiring a two-stage voltage adjustment.

According to the detection signal processing circuit for a rotation sensor of the present invention, it is preferable that the electric potential changing means changes the electric potential supplied from the power source line by reducing a constant voltage from the electric potential supplied from the power source line.

According to the detection signal processing circuit for a rotation sensor of the present invention, it is preferable that the electric potential changing means includes a constant current circuit capable of generating a constant current and a switch allowing the constant current circuit to supply the constant current. With this arrangement, it becomes possible to change the electric potential of the power source line by causing the constant current circuit to supply the constant current flowing from the power source line to the earth.

According to the detection signal processing circuit for a rotation sensor of the present invention, it is preferable that a constant voltage circuit is provided to supply a constant voltage to each of the pulse signal generating means, the forward/reverse judging means, and the electric potential changing means. Thus, even if the detection signal processing circuit is disposed far from the place where the voltage source is located, no adverse effect will be given by the voltage drop occurring in a long power source line. The detection signal processing circuit can operate properly.

According to the detection signal processing circuit for a rotation sensor of the present invention, it is preferable that an input current of the constant voltage circuit is constant. In this case, the electric potential of the power source line does not vary due to circuit operations or the like. Thus, it becomes possible to accurately detect the rotational direction of the rotor by changing the electric potential of the power source line.

According to the detection signal processing circuit for a rotation sensor of the present invention, it is preferable that the constant voltage circuit includes a constant voltage section producing a constant voltage based on a band gap, a differential amplifier inputting the constant voltage produce from the constant voltage section and also inputting a control voltage, and a control element having a control terminal receiving an output of the differential amplifier and input and output terminals connected between the power source line and an earth line. Accordingly, the input impedance of the constant voltage circuit can be increased by connecting its input side to the input side of the differential amplifier. The input current becomes substantially constant.

According to the first detection signal processing apparatus for a rotation sensor of the present invention, the pulse signal generating means of the detection signal processing circuit generates a pulse signal in response to a change occurring in the level of the detection signal produced from at least one of two sensing elements. Furthermore, the forward/reverse judging means of the detection signal processing circuit generates a judgment signal corresponding to the rotational direction of the rotor based on the detection signals of two sensing elements. And, the current path forming means allows a constant current to flow from an electric potential supply line to an earth line in response to the judgment signal of the forward/reverse judging means. Meanwhile, the rotational direction signal binarization circuit is connected to a voltage source via a resistor. A connecting point of the resistor and the rotational direction signal binarization circuit is connected to the electric potential supply line of the current path forming means. And, the rotational direction signal binarization circuit detects the constant current flowing from the electric potential supply line to the earth line based on a voltage drop occurring at the resistor, and generates the binary signal representing the rotational direction of the rotor.

According to the arrangement of the first detection signal processing apparatus for a rotor, detecting both the rotational speed and the rotational direction of the rotor is feasible by using three wiring cables of the power source line, the earth line, and the signal line outputting the pulse signal in accordance with the rotation of the rotor. Furthermore, detecting the rotational direction of the rotor is realized by reducing the electric potential of the power source line, namely by using the voltage adjustment of only one stage. Accordingly, the first detection signal processing apparatus of the present invention can reduce the electric power consumption compared with a system requiring a two-stage voltage adjustment.

According to the second detection signal processing apparatus for a rotation sensor of the present invention, the pulse signal generating means of the detection signal processing circuit generates a pulse signal in response to a change occurring in the level of the detection signal produced from at least one of two sensing elements. Furthermore, the forward/reverse judging means of the detection signal processing circuit generates a judgment signal corresponding to the rotational direction of the rotor based on the detection signals of two sensing elements. And, the current path forming means allows a constant current to flow from an electric potential supply line to an earth line in response to the judgment signal of the forward/reverse judging means. Meanwhile, the rotational direction signal binarization circuit detects the constant current flowing from the power source line to the earth line based on a voltage change occurring in the power source line, and generates the binary signal representing the rotational direction of the rotor.

According to the arrangement of the second detection signal processing apparatus for a rotor, detecting both the rotational speed and the rotational direction of the rotor is feasible by using three wiring cables of the power source line, the earth line, and the signal line outputting the pulse signal in accordance with the rotation of the rotor. Furthermore, detecting the rotational direction of the rotor is realized by reducing the electric potential of the power source line, namely by using the voltage adjustment of only one stage. Accordingly, the second detection signal processing apparatus of the present invention can reduce the electric power consumption compared with a system requiring a two-stage voltage adjustment.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Preferred embodiments of the present invention will be explained hereinafter with reference to attached drawings.

First Embodiment

Hereinafter, a rotation sensor capable of detecting both the rotational speed and the rotational direction of a wheel of an automotive vehicle will be explained in accordance with a first embodiment of the present invention with reference to FIGS. 1 to 6. The rotation sensor is, for example, disposed at an appropriate portion (i.e. rotation detecting portion) near a wheel of an automotive vehicle to detect a rotational condition of this wheel. The rotation sensor is associated with an ABS (i.e. Antilock Brake System), a VSC (Vehicle Stability Control) or other control device installed in the automotive vehicle. The rotation sensor must accurately detect the rotational speed of the wheel in both forward and backward directions in a wide range covering lower speeds and higher speeds.

Figure 1A:
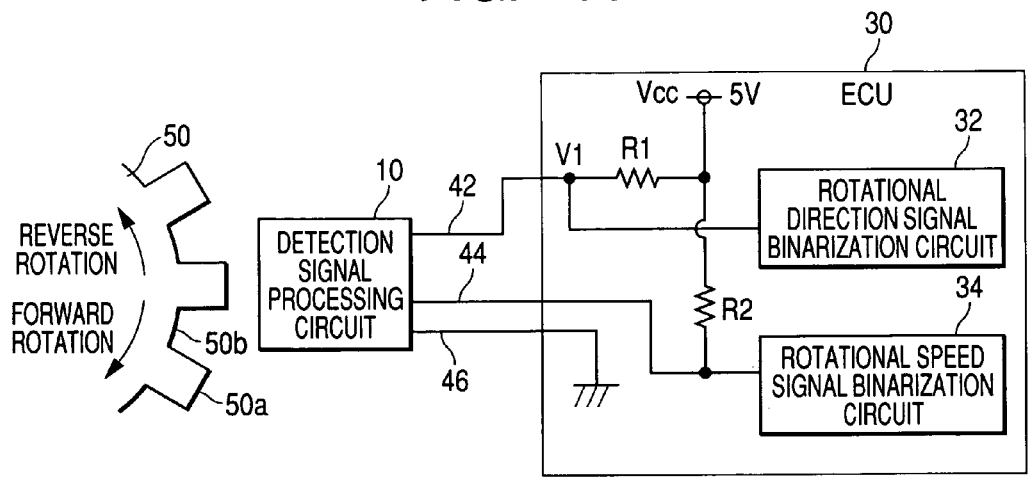
FIG. 1A is a block diagram showing a detection signal processing circuit and ECU in accordance with a first embodiment of the present invention.

FIG. 1A is a block diagram showing a detection signal processing circuit and ECU (i.e. electronic control unit) in accordance with a first embodiment of the present invention. A brake control ECU 30, connected to a detection signal processing circuit 10, detects the rotational direction and the rotational speed of a gear 50. The gear 50, which is made of a magnetic member as a detection object, integrally rotates with a wheel (not shown) of the automotive vehicle. The gear 50 has protruding portions 50a and recessed portions 50b formed at predetermined pitches along the outer periphery thereof. The detection signal processing circuit 10, disposed in the vicinity of the gear 50, detects the protruding portions 50a and the recessed portions 50b of the gear 50 and outputs the detection signal.

The detection signal processing circuit 10 receives an electric potential of a power source line 42 applied (via a later-described resistor R1) from a power source Vcc in the ECU 30. On the other hand, the detection signal processing circuit 10 is connect via an earth line 46 to the earth in the ECU 30. The detection signal processing circuit 10 outputs a rotational speed signal via a signal line 44 to a rotational speed signal binarization circuit 34 in the ECU 30. A joint of the signal line 44 and the rotational speed signal binarization circuit 34 is connected via a pull-up resistor. R2 to the power source Vcc. An electric potential detecting resistor R1 is serially connected between the power source line 42 and the power source Vcc in the ECU 30. The detection signal processing circuit 10 is capable of adjusting the current value in accordance with rotational direction (i.e. forward rotation and reverse rotation) of the gear 50. In other words, the detection signal processing circuit 10 can change the electric potential V1 of the power source line 42. The rotational direction signal binarization circuit 32 in the ECU 30 has a function of binarizing the electric potential change of the power source line 42.

Figure 1B:
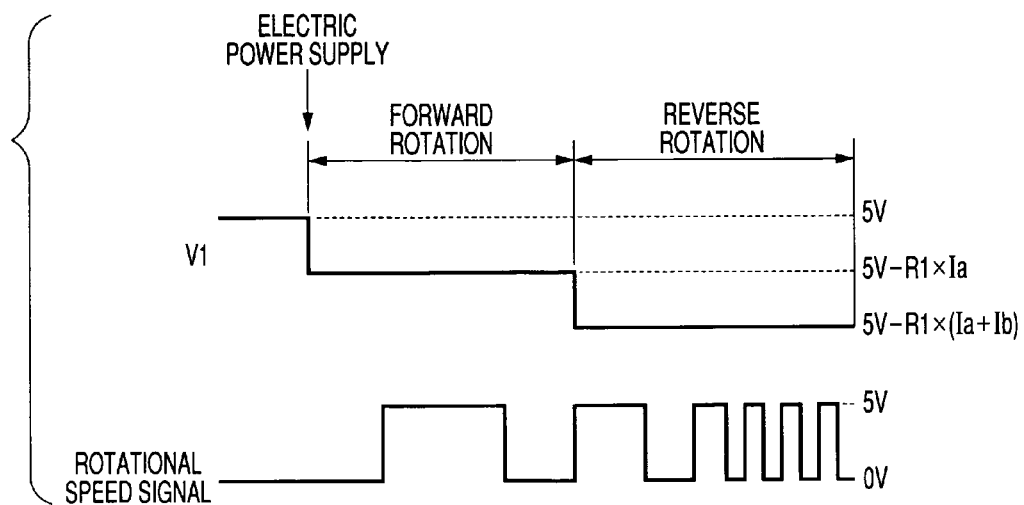
FIG. 1B is a timing chart showing an electric potential of a power source line and a rotational speed signal of a signal line.

FIG. 1B is a timing chart showing the electric potential V1 of the power source line 42 and the rotational speed signal produced via the signal line 44. The electric potential V1 of the power source line 42 shows a voltage drop from the power source Vcc (i.e. 5 V) upon supply of electric power when the gear 50 rotates in the forward rotation (i.e. in the clockwise direction shown in FIG. 1). The voltage drop occurring in the electric potential V1 is proportional to a consumed current Ia in the detection signal processing circuit 10 (i.e. consumed current Ia×electric potential detecting resistor R1). On the other hand, when the gear 50 rotates in the reverse rotation (i.e. in the counterclockwise direction shown in FIG. 1), the electric potential V1 of the power source line 42 shows a relatively larger voltage drop from the power source Vcc (i.e. 5 V) upon supply of electric power. In this case, the voltage drop occurring in the electric potential V1 is proportional not only to the consumed current Ia in the detection signal processing circuit 10 but also to a constant current Ib (i.e. consumed current Ia+constant current Ib)×electric potential detecting resistor R1). Thus, the rotational direction signal binarization circuit 32 can produce a binary output representing either the forward rotation or the reverse rotation based on the electric potential change being differentiated as described above. On the other hand, the detection signal processing circuit 10 outputs a rotational speed signal (i.e. a pulse signal representing the rotation) of the gear 50 via the signal line 44 to the ECU 30.

Figure 2:
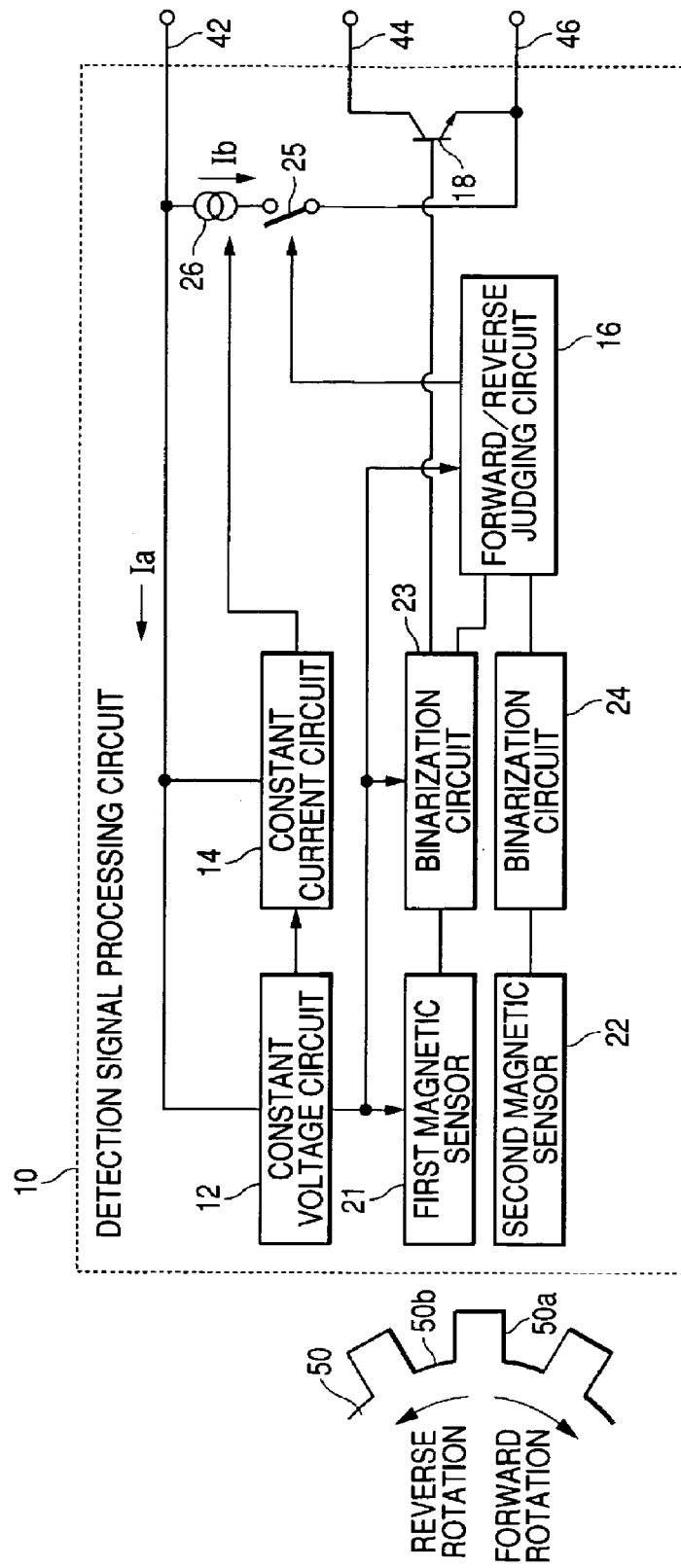
FIG. 2 is a block diagram showing a detailed arrangement of the detection signal processing circuit shown in FIG. 1.
Figure 3A:
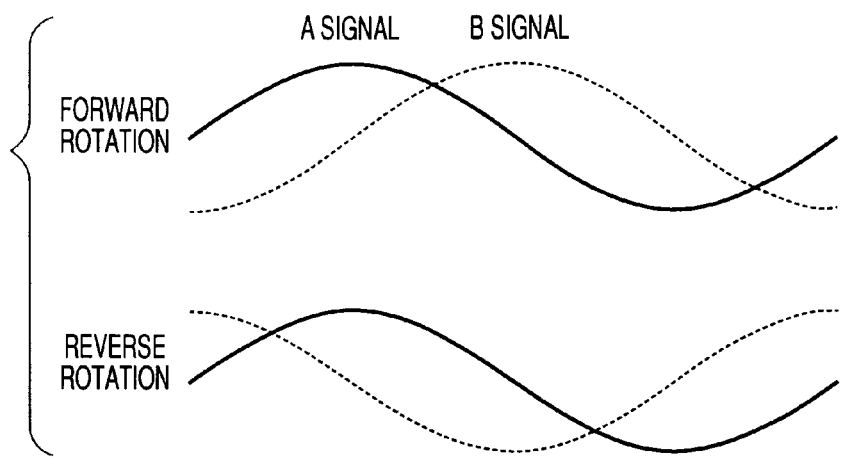
FIG. 3A is a waveform diagram showing output signals of first and second magnetic sensors.

FIG. 2 is a block diagram showing a detailed arrangement of the detection signal processing circuit 10. The detection signal processing circuit 10 includes two sensing elements, i.e. a first magnetic sensor 21 and a second magnetic sensor 22, which are respectively made of a magnetic resistor element (MRE) capable of outputting a detection signal. The first magnetic sensor 21 and the second magnetic sensor 22 are disposed in confronting relationship with the outer periphery of the gear 50. The distance between the first magnetic sensor 21 and the second magnetic sensor 22 is equivalent to $(N\pm 1/4)\times$(pitch of protruding portions 50a), where N is an integer. As described later, the first magnetic sensor 21 and the second magnetic sensor 22 output sine-wave detection signals (i.e. A signal and B signal) with the phase difference of 1/4 pitch in accordance with rotation of the gear 50, as shown in FIG. 3A. The sine-wave detection signals produced from the first magnetic sensor 21 and the second magnetic sensor 22 are sent into binarization circuits 23 and 24 (serving as pulse signal generating means of the present invention), respectively. The binarization circuits 23 and 24 convert the entered sine-wave detection signals into rectangular-wave binary outputs based on comparison with a predetermined threshold, as shown in FIG. 3B.

More specifically, the first magnetic sensor 21 and the second magnetic sensor 22 respectively output the detection signals of high level when they face the protruding portions 50a of the gear 50, and output the detection signals of low level when they face the recessed portions 50b of the gear 50. During one pitch from one protruding portion 50a to the next protruding portion 50a, rectangular-wave detection signals Sa and Sb are produced. The rectangular-wave detection signals Sa and Sb are mutually offset by an angle corresponding to 1/4 pitch as understood from the positional relationship between the magnetic sensors 21 and 22.

Figure 3B:
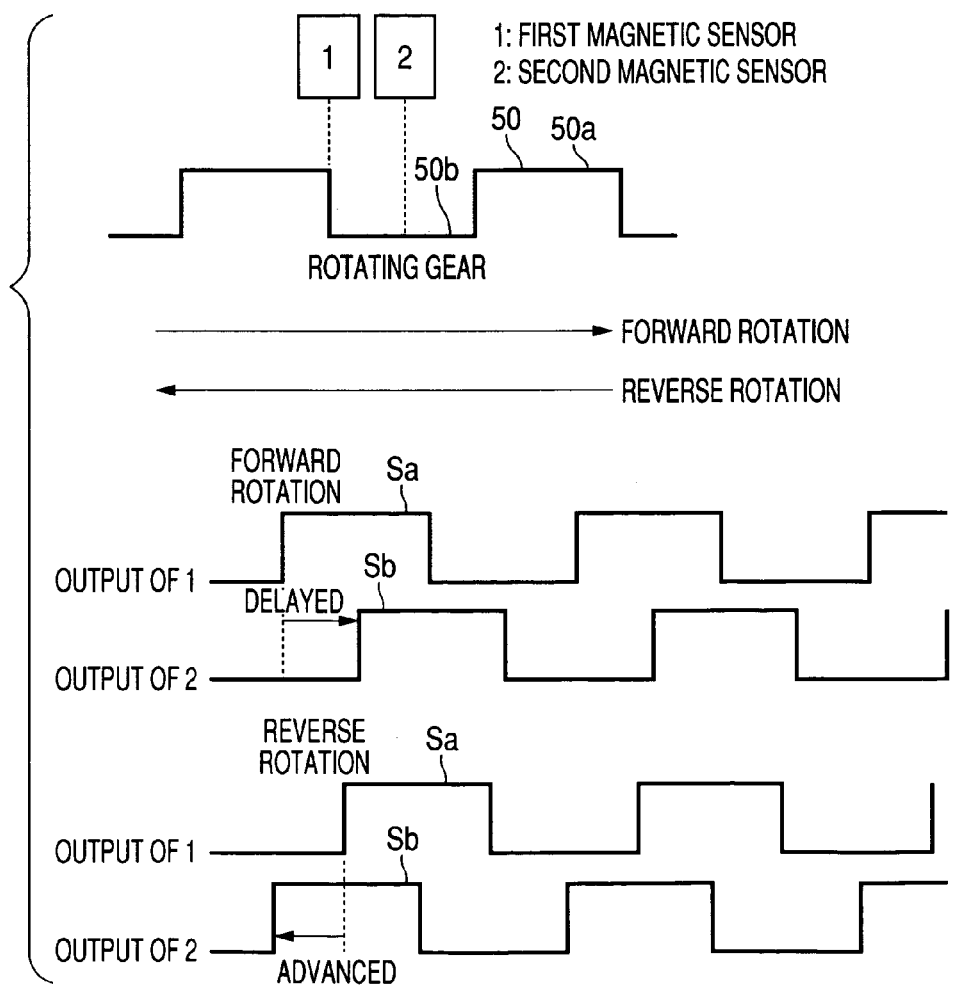
FIG. 3B is a waveform diagram showing detection signals of first and second binarization circuits.

A forward/reverse judging circuit 16, serving as forward/reverse judging means of the present invention, receives binary outputs from the binarization circuits 23 and 24 and makes a judgment as to whether the gear 50 is rotating in the forward direction or in the reverse direction by checking whether the detection signal Sa of the first magnetic sensor 21 is delayed or advanced relative to the detection signal Sb of the second magnetic sensor 22, as shown in FIG. 3B. When the gear 50 is rotating in the reverse direction, the forward/reverse judging circuit 16 turns on a switch 25 to cause a constant current source 26 to supply a constant current Ib flowing to the earth line 46 being grounded. The switch 25 is arranged by a transistor or comparable control element. A constant current circuit 14 adjusts the constant current source 26 so that the constant current Ib is stably supplied from the constant current source 26.

A constant voltage circuit 12, connected to the power source line 42, supplies a constant electric potential to the first magnetic sensor 21, the second magnetic sensor 22, the binarization circuits 23 and 24, the forward/reverse judging circuit 16, and the constant current circuit 14. According to the first embodiment, the constant voltage circuit 12 is provided in the detection signal processing circuit 10. Thus, even if the detection signal processing circuit 10 is located far from the ECU 30, no adverse effect will be given by the voltage drop occurring in a long power source line. The detection signal processing circuit 10 can operate properly.

Figure 4:
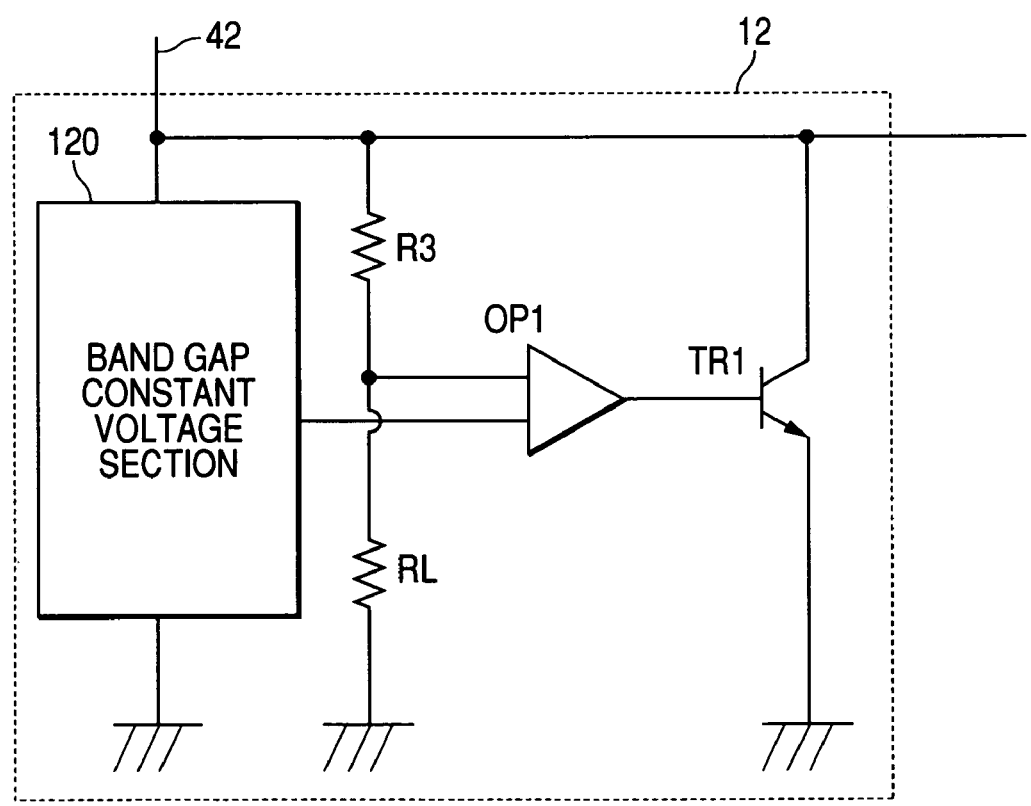
FIG. 4 is a circuit diagram showing one example of a constant voltage circuit shown in FIG. 2.

FIG. 4 shows one example of a circuit arrangement of the constant voltage circuit 12. The constant voltage circuit 12 of the first embodiment includes a band gap constant voltage section 120, a differential amplifier OP1, a transistor TR1, and resistors R3 and RL. The transistor TR1 has one end connected to the power source line 42 and the other end connected to the earth. The resistors R3 and RL are connected in series between the power source line 42 and the earth. The band gap constant voltage section 120 produces a constant voltage which is applied to one input terminal of the differential amplifier OP1. A control voltage formed according to the dividing ratio of resistors R3 and RL is applied to the other input terminal of the differential amplifier OP1. An output of the differential amplifier OP1 is applied to a base of the transistor TR1. According to the constant voltage circuit 12 of the first embodiment, the input side of this circuit is connected to the input side of the differential amplifier OP1. Therefore, the input impedance of the constant voltage circuit 12 can be increased. The input current becomes substantially constant. In this case, the input current of the constant voltage circuit 12 is kept constant because the electric potential of the power source line 42 does not vary due to circuit operations or the like. Thus, the rotational direction signal binarization circuit 32 in the ECU 30 can accurately detect the rotational direction by changing the electric potential V1 of the power source line 42.

Figure 5A:
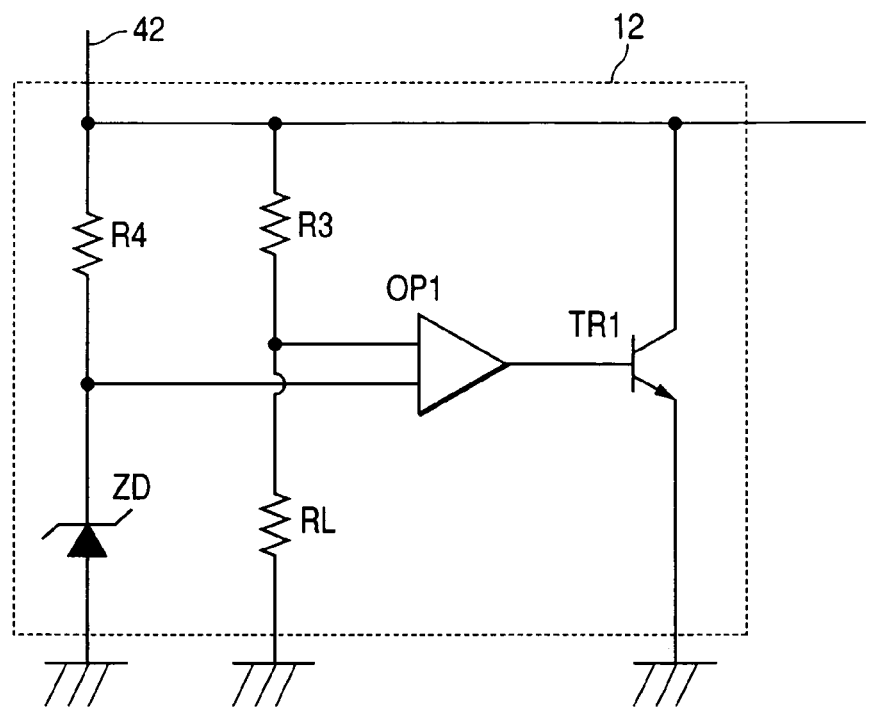
FIG. 5A is a circuit diagram showing another example of the constant voltage circuit shown in FIG. 2.
Figure 5B:
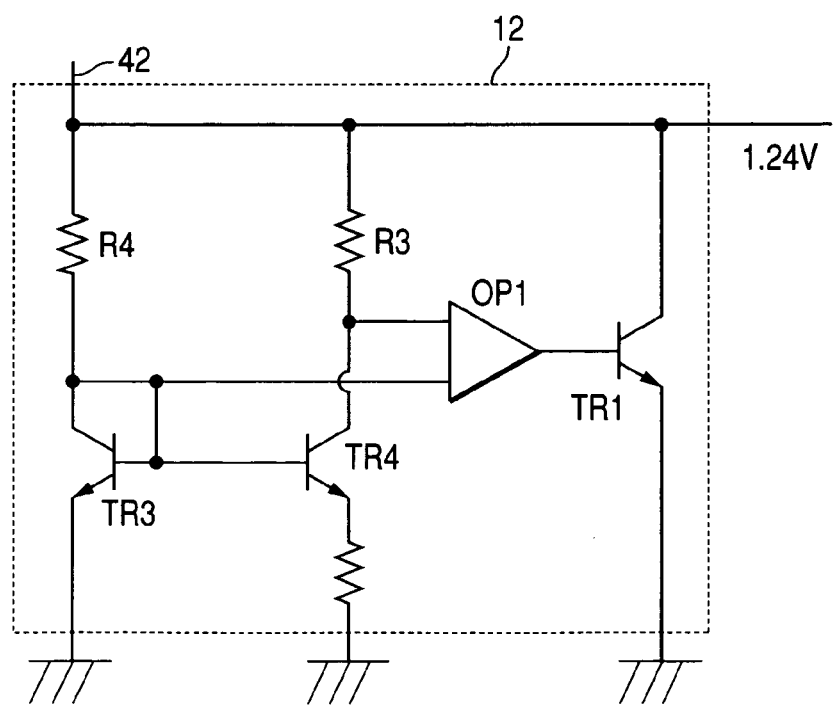
FIG. 5B is a circuit diagram showing another example of the constant voltage circuit shown in FIG. 2.

FIGS. 5A and 5B show other practical examples of the constant voltage circuit 12 including a band gap constant voltage section. According to the example of FIG. 5A, the band gap constant voltage section is arranged by a Zener diode ZD which is serially connected with a resistor R4 between the power source line 42 and the earth. According to the example of FIG. 5B, the band gap constant voltage section is arranged by a pair of transistors TR3 and TR4 which are mutually connected at their bases. The transistor TR3 and the resistor R4 are serially connected between the power source line 42 and the earth. The transistor TR4 and the resistor R3 are serially connected between the power source line 42 and the earth.

Figure 6:
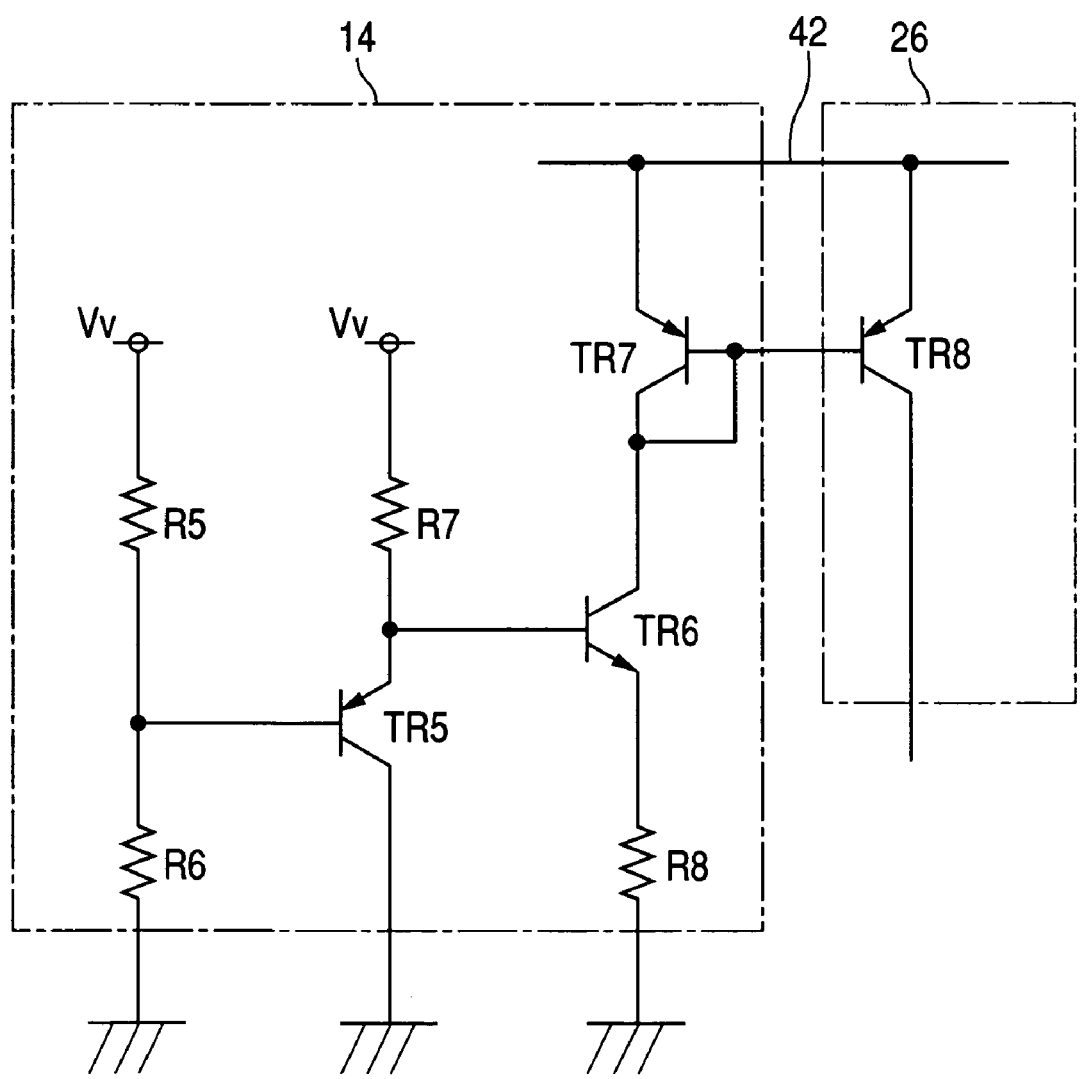
FIG. 6 is a circuit diagram showing an example of a constant current circuit shown in FIG. 2.

FIG. 6 shows an example of the constant current circuit 14 and the constant current source 26. The first embodiment employs a current-mirror circuit arrangement for forming the constant current circuit 14 and the constant current source 26. More specifically, resistors R5 and R6 are serially connected between the terminal of electric potential Vv and the earth being grounded. A voltage formed according to the dividing ratio of resistors R5 and R6 is applied to the base of a transistor TR5. The transistor TR5 has a collector grounded to the earth and an emitter connected via a resistor R7 to the terminal of electric potential Vv. The transistor TR5 has an emitter connected to a base of transistor TR6. The transistor TR6 has an emitter grounded via a resistor R8 to the earth. The transistor TR6 has a collector connected via a transistor TR7 to the power source 42. The transistor TR7 has an emitter connected to the power source 42. The transistor TR7 has a base and a collector mutually connected. The base of transistor TR7 is connected to the base of transistor TR8 provided in the constant current source 26. The transistor TR8 has an emitter connected to the power source line 42 and a collector connected to the switch 25 shown in FIG. 2.

According to the detection signal processing apparatus for a rotation sensor of the first embodiment of the present invention, the binarization circuit 23 of the detection signal processing circuit 10 outputs a pulse signal via the signal line 44 in response to a change occurring in the level of the detection signal produced from the first magnetic sensor 21. Furthermore, the forward/reverse judging circuit 16 of the detection signal processing circuit 10 outputs a judgment signal corresponding to the rotational direction of the gear 50 based on the detection signals of the first magnetic sensor 21 and the second magnetic sensor 22. The switch 25 is closed in response to the judgment signal produced from the forward/reverse judging circuit 16 so that the constant current source 26 can supply the constant current Ib flowing from the power source line 42 having a supplied electric potential to the earth line 46. On the other hand, the electric potential V1 of the power source line 42 is supplied to the constant current source 26 from the voltage source Vcc via the electric potential detecting resistor R1. The rotational direction signal binarization circuit 32 detects the constant current Ib flowing from the constant current source 26 based on a voltage drop occurring at the electric potential detecting resistor R1. And, the rotational direction signal binarization circuit 32 produces a binary signal representing the rotational direction of the gear 50.

In this case, outputting the signal representing the rotational direction of the gear 50 is feasible by allowing the constant current source 26 to supply the constant current Ib flowing from the electric potential V1 of the power source line 42 to the earth line 46 in response to the activation (i.e. turning-on action) of the switch 25. In other words, detecting both the rotational speed and the rotational direction of the gear 50 is feasible by using three wiring cables of the power source line 42, the earth line 46, and the signal line 44 outputting the pulse signal in accordance with the rotation of the gear (i.e. rotor) 50. Furthermore, outputting the rotational direction of the gear 50 is realized by reducing the electric potential of the power source line 42, namely by using the voltage adjustment of only one stage (i.e. electric potential detecting resistor R1×constant current (i.e. grounding current) Ib).

Figure 10A:
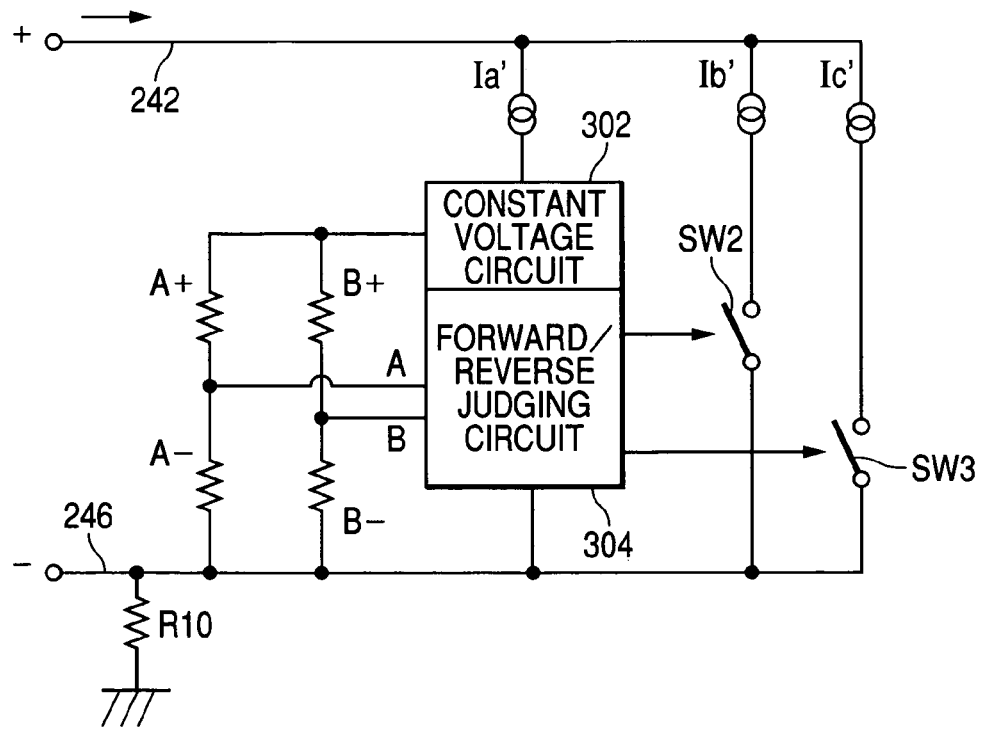
FIG. 10A is a circuit diagram showing a conventional rotation sensor circuit.
Figure 10B:
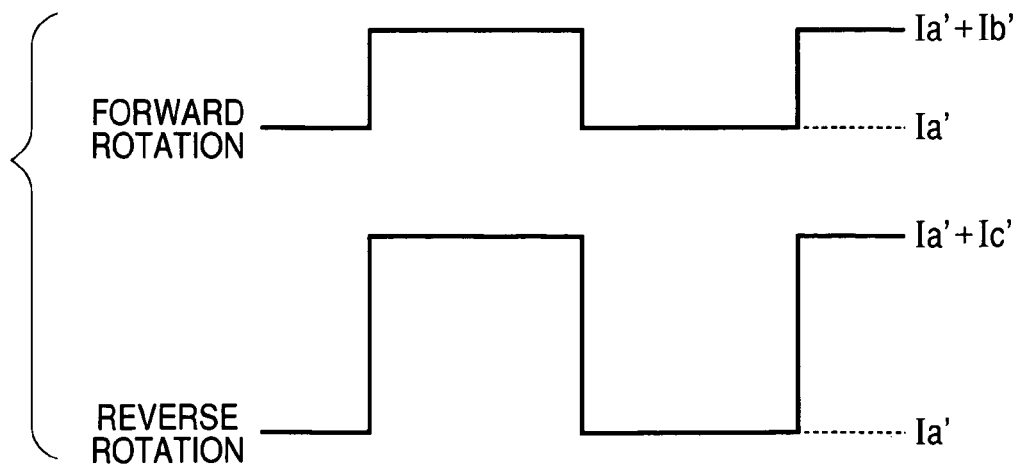
FIG. 10B is a signal timing chart of the conventional rotation sensor circuit.

Accordingly, the detection signal processing circuit of the first embodiment can reduce the electric power consumption compared with the above-described conventional rotation sensor circuit shown in FIGS. 10A and 10B (which requires a two-stage voltage adjustment). More specifically, according to the circuit arrangement shown in FIG. 10A, the electric potential of the output line 246 is R10×(circuit consumed current Ia'+grounding current Ib') at the high level of the detection signal during the forward rotation of the rotor, and R10×(circuit consumed current Ia'+grounding current Ic') at the high level of the detection signal during the reverse rotation of the rotor. Thus, detecting the rotational direction is feasible when the grounding current Ic' is set to be larger than the grounding current Ib'. When the constant current (i.e. grounding current) Ib of the first embodiment is equivalent to the grounding current Ib' in the circuit of FIG. 10A, the circuit arrangement of FIG. 10A is disadvantageous in electric power consumption because it requires the grounding current Ic' larger than the grounding current Ib'. Thus, compared with the conventional circuit shown in FIG. 10A, the detection signal processing circuit 10 according to the first embodiment has small electric power consumption. Accordingly, the detection signal processing circuit 10 of the first embodiment can reduce the current value of the power source line 42. The electric power consumption at the wiring cables can be reduced even when there is a relatively long distance between the ECU 30 and the rotation sensor detecting a wheel speed of, for example, a truck or a bus.

As apparent from the foregoing description, the present invention provides the detection signal processing circuit 10 for a rotation sensor, including two sensing elements 21 and 22 disposed in a confronting relationship with the rotor 50 to produce detection signals having different phases in accordance with rotation of the rotor 50, and detecting both the rotational speed and the rotational direction of the rotor 50 based on the detection signals. The detection signal processing circuit 10 of the present invention includes the pulse signal generating means (i.e. binarization circuit 23), the forward/reverse judging means (i.e. forward/reverse judging circuit 16), and the electric potential changing means (i.e. constant current source 26 and switch 25). The pulse signal generating means (23) is capable of generating a pulse signal in response to a change occurring in the level of the detection signal produced from at least one of two sensing elements 21 and 22. The forward/reverse judging means (16) is capable of generating a judgment signal corresponding to the rotational direction of the rotor 50 based on the detection signals of two sensing elements 21 and 22. And, the electric potential changing means (25, 26) is capable of changing an electric potential supplied from the power source line 42 in accordance with the judgment signal of the forward/reverse judging means (16).

Furthermore, the above-described first embodiment of the present invention provides a first detection signal processing apparatus for a rotation sensor including the detection signal processing circuit 10 and the rotational direction signal binarization circuit 32. The detection signal processing circuit 10 includes two sensing elements 21 and 22 disposed in a confronting relationship with the rotor 50 to produce detection signals having different phases in accordance with rotation of the rotor 50 and detects the rotational speed and the rotational direction of the rotor 50 based on the detection signals. And, the rotational direction signal binarization circuit 32 generates a binary signal representing the rotational direction of the rotor 50. The detection signal processing circuit 10 includes the pulse signal generating means (i.e. binarization circuit 23), the forward/reverse judging means (i.e. forward/reverse judging circuit 16), and the current path forming means (i.e. constant current source 26 and switch 25). The pulse signal generating means (23) is capable of generating a pulse signal in response to a change occurring in the level of the detection signal produced from at least one of two sensing elements 21 and 22. The forward/reverse judging means (16) is capable of generating a judgment signal corresponding to the rotational direction of the rotor 50 based on the detection signals of two sensing elements 21 and 22. And, the current path forming means (25, 26) is capable of allowing a constant current to flow from an electric potential supply line 42 to the earth line 46 in response to the judgment signal of the forward/reverse judging means (16). Meanwhile, the rotational direction signal binarization circuit 32 is connected to the voltage source Vcc via the resistor R1. The connecting point of the resistor R1 and the rotational direction signal binarization circuit 32 is connected to the electric potential supply line 42 of the current path forming means (25, 26). And, the rotational direction signal binarization circuit 32 detects the constant current Ib flowing from the electric potential supply line 42 to the earth line 46 based on a voltage drop occurring at the resistor R1, and generates the binary signal representing the rotational direction of the rotor. 50

Second Embodiment

Figure 7:
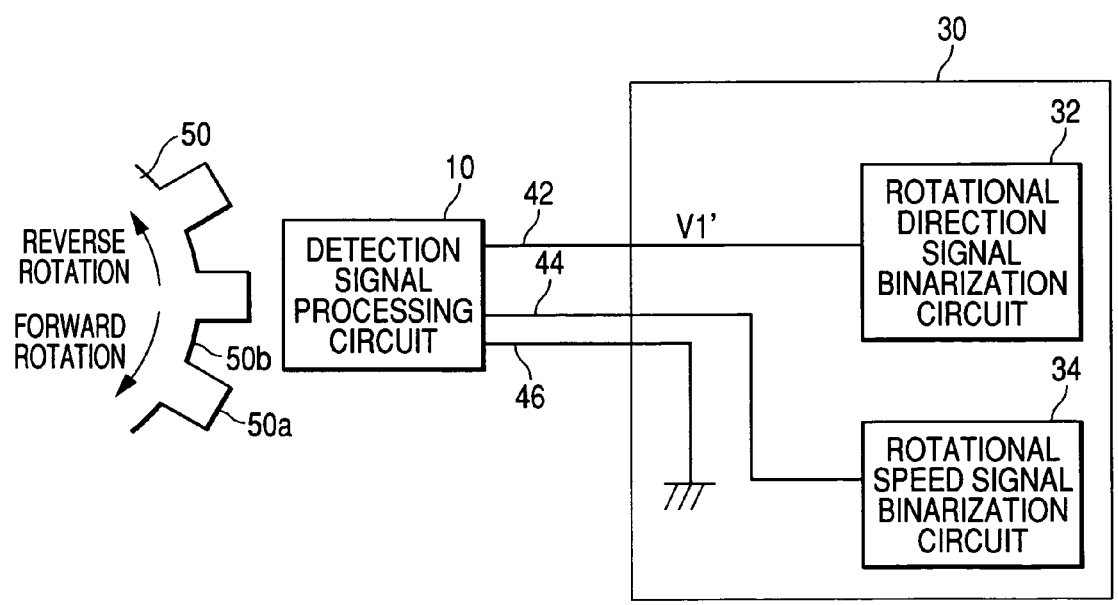
FIG. 7 is a block diagram showing a detection signal processing circuit and ECU in accordance with a second embodiment of the present invention.
Figure 8:
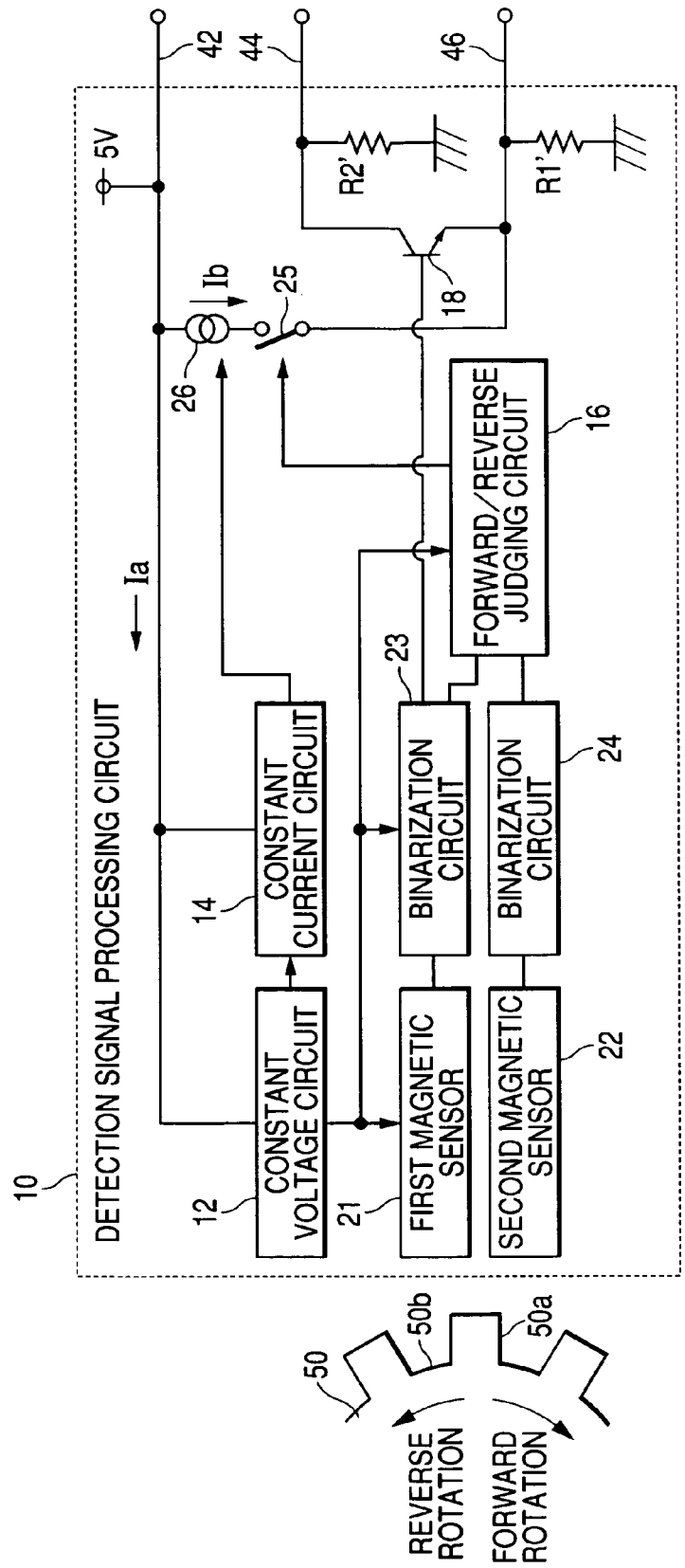
FIG. 8 is a block diagram showing a detailed arrangement of the detection signal processing circuit shown in FIG. 7.
Figure 9A:
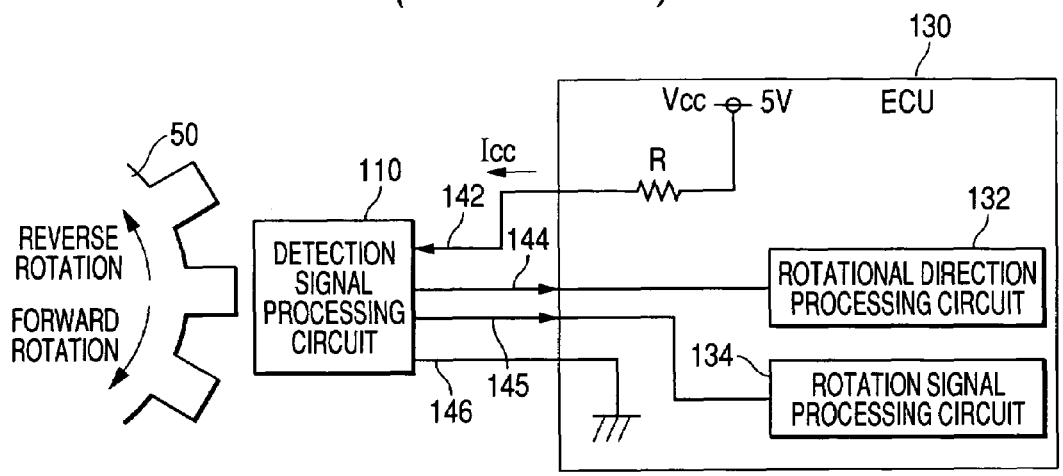
FIG. 9A is a circuit diagram showing a conventional rotation sensor circuit.
Figure 9B:
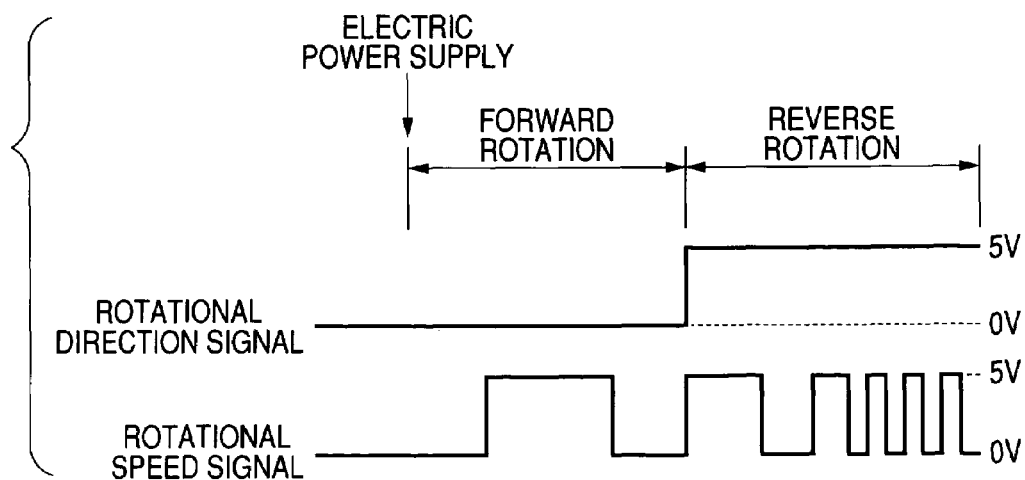
FIG. 9B is a signal timing chart of the conventional rotation sensor circuit.

Hereinafter, a detection signal processing circuit for a rotor and a related detection signal processing apparatus in accordance with a second embodiment of the present invention will be explained with reference to FIGS. 7 and 8. FIG. 7 is a block diagram showing a detection signal processing circuit and ECU in accordance with the second embodiment of the present invention. FIG. 8 is a block diagram showing a detailed arrangement of the detection signal processing circuit shown in FIG. 7. According to the above-described first embodiment explained with reference to FIGS. 1A and 2, the electric potential detecting resistor R1 and the pull-up resistor R2 are provided in the ECU 30. The second embodiment is differentiated in that both of an electric potential detecting resistor R1' and a pull-down resistor R2' are provided in the detection signal processing circuit 10.

According to the detection signal processing apparatus for a rotation sensor of the second embodiment of the present invention, the binarization circuit 23 of the detection signal processing circuit 10 outputs a pulse signal in response to a change occurring in the level of the detection signal produced from the first magnetic sensor 21. Furthermore, the forward/reverse judging circuit 16 of the detection signal processing circuit 10 outputs a judgment signal corresponding to the rotational direction of the gear 50 based on the detection signals of the first magnetic sensor 21 and the second magnetic sensor 22. The switch 25 is closed in response to the judgment signal produced from the forward/reverse judging circuit 16 so that the constant current source 26 can supply the constant current Ib flowing from the power source line 42 to the earth via the electric potential detecting resistor R1'. On the other hand, the rotational direction signal binarization circuit 32 detects the constant current Ib flowing from the constant current source 26 based on a change of electric potential V1' of the power source line 42. And, the rotational direction signal binarization circuit 32 produces a binary signal representing the rotational direction of the gear 50. In this case, outputting the signal representing the rotational direction of the gear 50 is feasible by allowing the constant current source 26 to supply the constant current Ib flowing from the power source line 42 to the earth in response to the activation (i.e. turning-on action) of the switch 25. In other words, detecting both the rotational speed and the rotational direction of the gear 50 is feasible by using three wiring cables of the power source line 42, the earth line 46, and the signal line 44 outputting the pulse signal in accordance with the rotation of the gear 50. Furthermore, outputting the rotational direction of the gear 50 is realized by reducing the electric potential of the power source line 42, namely by using the voltage adjustment of only one stage. Accordingly, the circuit arrangement of the second embodiment can reduce the electric power consumption.

As apparent from the foregoing description, the second embodiment of the present invention provides a second detection signal processing apparatus for a rotation sensor including the detection signal processing circuit 10 and the rotational direction signal binarization circuit 32. The detection signal processing circuit 10 includes two sensing elements 21 and 22 disposed in a confronting relationship with the rotor 50 to produce detection signals having different phases in accordance with rotation of the rotor 50 and detects the rotational speed and the rotational direction of the rotor 50 based on the detection signals. And, the rotational direction signal binarization circuit 32 generates a binary signal representing the rotational direction of the rotor 50. The detection signal processing circuit 10 includes the pulse signal generating means (i.e. binarization circuit 23), the forward/reverse judging means (i.e. forward/reverse judging circuit 16), and the current path forming means (i.e. constant current source 26 and switch 25). The pulse signal generating means (23) is capable of generating a pulse signal in response to a change occurring in the level of the detection signal produced from at least one of two sensing elements 21 and 22. The forward/reverse judging means (16) is capable of generating a judgment signal corresponding to the rotational direction of the rotor based on the detection signals of two sensing elements 21 and 22. And, the current path forming means (25, 26) is capable of allowing the constant current Ib to flow from the power source line 42 to the earth via the resistor R1' in response to the judgment signal of the forward/reverse judging means (16). Meanwhile, the rotational direction signal binarization circuit 32 detects the constant current Ib flowing from the power source line 42 to the earth based on a voltage change occurring in the power source line 42, and generates the binary signal representing the rotational direction of the rotor 50.

The detection signal processing circuit for a rotation sensor and/or related detection signal processing apparatus in accordance with the above-described first or second embodiment of the present invention is not limited to the detection of rotational speed and rotational direction of a wheel, and accordingly can be used to detect a rotational speed and a rotational direction of any kind of rotor used in, for example, a crank angle sensor or a cam angle sensor. Furthermore, the sensors capable of detecting the rotation of a rotor are not limited to the magnetic sensors used in the above-described embodiments. Accordingly, it is possible to use any other type of sensors, such as optical sensors.

What is claimed is:

1. A signal processing circuit disposed in a rotation sensor, the rotation sensor including two sensing elements disposed in a confronting relationship with a rotor to produce detection signals having different phases in accordance with rotation of said rotor, and detecting a rotational speed and a rotational direction of said rotor based on said detection signals, said detection signal processing circuit comprising:
   pulse signal generating means for generating pulse signals in response to a change occurring in a level of the detection signal produced from at least one of said two sensing elements;
   forward/reverse judging means for generating a judgment signal based on the pulse signals from the pulse signal generating means, the judgment signal showing whether the rotational direction of said rotor is a forward direction or a reverse direction; and
   potential changing means comprising: a path connecting a power source line to a predetermined power source and an earth line; a constant current source generating a constant current, and being disposed in the path; and a switch disposed in the path, and being controlled to be selectively switched between on/off states to connect or disconnect the constant current source and the earth line,
   wherein the potential changing means changes an electric potential supplied to the signal processing circuit via the power source line on the basis of a voltage drop caused in response to the selectively switching between the on/off states of the switch so that the changed electric potential shows the rotational direction of the rotor, and controls the switch in accordance with said judgment signal of said forward/reverse judging means.

2. The signal processing circuit in accordance with claim 1, further comprising a constant voltage circuit to supply a constant voltage to each of said pulse signal generating means, said forward/reverse judging means, and said potential changing means.

3. The signal processing circuit in accordance with claim 2, wherein an input current of said constant voltage circuit is constant.

4. The signal processing circuit in accordance with claim 3, wherein said constant voltage circuit includes:
   a constant voltage section producing a constant voltage based on a band gap;
   a differential amplifier inputting the constant voltage produced from said constant voltage section and also inputting a control voltage; and
   a control element having a control terminal receiving an output of said differential amplifier and input and output terminals connected between said power source line and the earth line.

5. The signal processing circuit in accordance with claim 1, wherein the power source line of the signal processing circuit is connected in series to a resistor disposed externally from the signal processing circuit, the resistor causing the voltage drop in response to the switch being controlled to be selectively switched to on state.

6. The signal processing circuit in accordance with claim 5, wherein the potential changing means is configured to control the switch to be selectively switched to the on state when the forward/reverse judging means generates the judgment signal showing the reverse direction of the rotor.

7. The signal processing circuit in accordance with claim 1, wherein the path connecting the switch and the earth line includes a resistor causing the voltage drop in response to the switch being controlled to be selectively switched to the on state.

8. A signal processing unit incorporated in a rotation sensor including a detection signal processing circuit and a rotational direction signal binarization circuit, wherein
   said detection signal processing circuit includes two sensing elements disposed in a confronting relationship with a rotor to produce detection signals having different phases in accordance with rotation of said rotor and detects a rotational speed and a rotational direction of said rotor based on said detection signals, and
   said rotational direction signal binarization circuit generates a binary signal representing the rotational direction of said rotor, wherein
   said detection signal processing circuit comprises:
   pulse signal generating means for generating a pulse signal in response to a change occurring in a level of the detection signal produced from at least one of said two sensing elements;
   forward/reverse judging means for generating a judgment signal corresponding to the rotational direction of said rotor based on the detection signals of said two sensing elements; and
   current path forming means for allowing a constant current to flow from a power source line to an earth via a resistor in response to said judgment signal of said forward/reverse judging means, and
   said rotational direction signal binarization circuit detects said constant current flowing from said power source line to said earth based on a voltage change occurring in said power source line, and generates said binary signal representing the rotational direction of said rotor.

9. A signal processing unit incorporated in a rotation sensor including a detection signal processing circuit and a rotational direction signal binarization circuit, wherein
   said detection signal processing circuit includes two sensing elements disposed in a confronting relationship with a rotor to produce detection signals having different phases in accordance with rotation of said rotor and detects a rotational speed and a rotational direction of said rotor based on said detection signals, and
   said rotational direction signal binarization circuit generates a binary signal representing the rotational direction of said rotor, wherein
   said detection signal processing circuit comprises:
   pulse signal generating means for generating a pulse signal in response to a change occurring in a level of the detection signal produced from at least one of said two sensing elements;
   forward/reverse judging means for generating a judgment signal corresponding to the rotational direction of said rotor based on the detection signals of said two sensing elements; and
   current path forming means for allowing a constant current to flow from an electric potential supply line to an earth line response to said judgment signal of said forward/reverse judging means, and
   said rotational direction signal binarization circuit is connected to a voltage source via a resistor, wherein a connecting point of said resistor and said rotational direction signal binarization circuit is connected to said electric potential supply line of said current path forming means, and said rotational direction signal binarization circuit detects said constant current flowing from said electric potential supply line to said earth line based on a voltage drop occurring at said resistor, and generates said binary signal representing the rotational direction of said rotor.

10. A rotation sensor detecting at least a rotational direction of a rotor to be targeted, comprising:

first and second sensing elements sensing rotation of the rotor to output first and second signals indicative of the rotation, the first and second signals being different in phase from each other;

converting means for converting the first and second signals into corresponding pulse signals, respectively;

first determining means for determining whether or not the rotational direction of the rotor is a forward direction or a reverse direction based on the converted pulse signals;

changing means for changing an amount of power consumption in the rotation sensor so that a voltage on a power source line from a predetermined power source is chanced based on determined results of the first determining means; and second determining means for determining whether or not the rotational direction of the rotor is the forward direction or the reverse direction based on the voltage of the power source line, wherein the changing means comprises:

a path for connecting the power source line to an earth line;

a constant current source generating a constant current, the constant current source being disposed in the path;

a switch disposed in the path, the switch being switched between on/off states to selectively connect or disconnect the constant current source from ground; and means for changing the voltage on the power source line on the basis of a voltage drop caused in response to the selectively switching between the on/off states of the switch so that the changed voltage shows the rotational direction of the rotor.

11. The rotation sensor of claim 10, further comprising a resistor disposed on the power source line to cause the voltage drop.

12. The rotation sensor of claim 11, wherein the changing means is configured to switch the switch to the on state when the first determining means determines the rotational direction of the rotor is the reverse direction.

13. The rotation sensor of claim 11, wherein the second determining means has an input electrically connected to the power source line to receive the voltage drop from a voltage of the predetermined power source.

14. The rotation sensor of claim 10, further comprising a resistor disposed in the path to cause the voltage drop.

15. The rotation sensor of claim 10, wherein the voltage drop is a two-level drop depending on which direction the rotor rotates.

16. The rotation sensor of claim 15, wherein the two-level drop includes a first voltage drop from a voltage of the predetermined power source and a second voltage drop following the first voltage drop, the first voltage drop occurring when the first determining means determines that the rotational direction of the rotor is the forward direction and the second voltage drop occurring when the first determining means determines that the rotational direction of the rotor is the reverse direction.

* * * * *